(12) United States Patent
Burdeniuc

(10) Patent No.: US 6,902,679 B2
(45) Date of Patent: Jun. 7, 2005

(54) TREATMENT OF WATER CONTAINING ORGANIC WASTES WITH AROMATIC AMINE NITRATE SALTS

(75) Inventor: Juan Jesus Burdeniuc, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 618 days.

(21) Appl. No.: 10/056,951

(22) Filed: Jan. 25, 2002

(65) Prior Publication Data

US 2003/0066806 A1 Apr. 10, 2003

Related U.S. Application Data

(63) Continuation-in-part of application No. 09/813,391, filed on Mar. 21, 2001, now Pat. No. 6,379,562.

(51) Int. Cl.$^7$ .................................................. C02F 1/72
(52) U.S. Cl. ........................ 210/761; 210/903; 210/908
(58) Field of Search ................................ 210/758, 761, 210/903, 908

(56) References Cited

U.S. PATENT DOCUMENTS

| | | | |
|---|---|---|---|
| 4,654,149 A | 3/1987 | Harada et al. ............... | 210/763 |
| 5,118,447 A | 6/1992 | Cox et al. .................... | 252/626 |
| 5,221,486 A | 6/1993 | Fassbender ................. | 210/757 |
| 5,250,193 A | 10/1993 | Sawicki et al. ............. | 210/761 |
| 5,641,413 A | 6/1997 | Momont et al. ............ | 210/761 |
| 5,683,587 A | 11/1997 | Ferrara et al. | |
| 5,961,837 A | 10/1999 | Ferrara et al. | |
| 6,030,520 A * | 2/2000 | Dziewinski et al. ........ | 205/771 |
| 6,332,986 B1 * | 12/2001 | Johnson et al. ............. | 210/758 |
| 6,395,188 B1 * | 5/2002 | Burdeniuc et al. .......... | 210/758 |

FOREIGN PATENT DOCUMENTS

| | | |
|---|---|---|
| GB | 1375259 | 11/1974 |
| JP | 61257292 | 11/1986 |
| JP | 4200692 | 7/1992 |
| JP | 4059094 | 9/1992 |
| JP | 4061987 | 10/1992 |

OTHER PUBLICATIONS

Leavitt, David D. and Abraham, Martin A., "Acid–Catalyzed Oxidation of 2,4–Dichlorophenoxyacetic Acid by Ammonium Nitrate in Aqueous Solution," Environ. Sci. Technol. vol. 24, No. 4 1990, pp 566–571.

Leavitt, David D., Horbath, Joe S., and Abraham, Martin A., "Homogeneously Catalyzed Oxidation for the Destruction of Aqueous Organic Wastes" Environmental Progress (vol. 9, No. 4) pp 222–228.

Proesmans, Petra I., Luan, Li, and Buelow, Steven J., "Hydrothermal Oxidation of Organic Wastes Using Ammonium Nitrate," Ind. Eng. Chem. Res. 1997, 36 1559–1566.

* cited by examiner

Primary Examiner—Betsey Morrison Hoey
(74) Attorney, Agent, or Firm—Mary E. Bongiorno

(57) ABSTRACT

A process for wet oxidation of a waste stream containing organic carbon and organic or inorganic nitrogen-containing pollutants which comprises initially removing organic or inorganic nitrogen-containing pollutants using a nitrate salt of an aliphatic or aromatic amine as the denitrifying agent at a temperature from 180 to 300° C. and a pressure sufficient to maintain liquid phase conditions; and, then, effecting further removal of the organic carbon containing pollutant by treatment with activated carbon, chemical oxidation, or biotreatment.

15 Claims, No Drawings

TREATMENT OF WATER CONTAINING ORGANIC WASTES WITH AROMATIC AMINE NITRATE SALTS

CROSS REFERENCE TO RELATED APPLICATIONS

This application is a continuation-in-part of U.S. application Ser. No. 09/813,391 filed on Mar. 21, 2001, U.S. Pat. No. 6,379,562 issued Apr. 30, 2002.

BACKGROUND OF THE INVENTION

Wet air oxidation is a well-known treatment process for the removal of COD and BOD from industrial and municipal wastewater streams. The process involves contacting a wastewater stream with an oxidizing source, such as oxygen, ammonium nitrate or nitric acid at elevated temperatures and pressures to oxidize pollutants. Most carbonaceous material is converted to carbon dioxide. The nitrogen present either from organo-nitrogen compounds or other sources is converted to nitrogen gas.

The following references illustrate wet oxidation processes:

Proesmans, et al. (*Ind. Eng. Chem. Res.* 1997, 36 1559–1566) report on a high temperature and pressure (500° C./345 bar) hydrothermal oxidation process to remove organic compounds from a waste stream using ammonium nitrate as the oxidizing agent. In the oxidation of methanol and phenol, the authors report that unless an excess of oxidizable carbon is present, NOx in the effluent may become a problem. To avoid NOx production and reduce carbon components to carbon dioxide, a polishing step using hydrogen peroxide is suggested.

GB 1,375,259 discloses the wet oxidation of carbon and nitrogen containing materials to gaseous reaction products using $HNO_3$ and/or a nitrate as oxidizing agent, at temperatures of between 150° C. and the critical temperature of water. The preferred oxidizing agent is $NH_4NO_3$, which disappears completely from the reaction medium. Example VII shows the treating of a waste stream of caprolactam, the sodium salt of aminocaproic acid and sodium sulfate with nitric acid at a temperature of 300° C. at 15 bars. The patentees report that slow heating of the reaction mixture resulted in reduced corrosiveness of the reactant mixture.

U.S. Pat. No. 4,654,149 discloses the use of a noble metal catalyst supported on a titania carrier in a wet oxidation process to decompose ammonium nitrate at 250° C. for 60 minutes. Approximately from 50–99% decomposition of both ammonium nitrate and nitrite is achieved without air present. Further examples show wet oxidation of phenol with 0.2 times the required amount of oxygen.

JP 61 257,292 discloses the catalytic wet oxidation of ammonium nitrate wastewaters with 1.0 to 1.5 times the stoichiometric oxygen required for ammonia decomposition, at a pH of 3–11.5 at a temperature from 100 to 370° C. with a supported noble metal catalyst.

U.S. Pat. No. 5,118,447 discloses a process for the thermochemical nitrate destruction of an aqueous solution of nitrate or nitrite. The solution is contacted with a stoichiometric amount of formic acid or formate salt, depending upon the pH. Wet oxidation is effected by heating to 200 to 600° C. in the liquid phase to form elemental nitrogen and carbon dioxide. The reaction may be carried out over a pH range of 0–14.

U.S. Pat. No. 5,221,486 discloses a denitrification process where the types of nitrogen compounds present in a waste stream are identified and quantified. The oxidized and reduced forms of nitrogen are balanced and, then, an appropriate nitrogen containing reactant, such as ammonia or a nitrite or nitrate compound, is added and the mixture is heated to 300 to 600° C. under pressure to effect denitrification.

U.S. Pat. No. 5,641,413 discloses the two stage wet oxidation of wastewater containing a carbonaceous and nitrogen species. In the first stage the COD is removed by wet oxidation at a temperature of less than 373° C. and a pressure sufficient to maintain a liquid water phase. The remaining nitrogen compounds are converted to nitrogen in the second stage by adding sufficient inorganic nitrogen-containing compound to the oxidized wastewater to produce essentially equal concentrations of ammonia-nitrogen, nitrite-nitrogen plus nitrate-nitrogen and a waste stream of reduced COD. Mineral acid is added to the oxidized wastewater to produce a pH between 4 and 7. Optionally, a transition metal salt is added, to catalyze a thermal denitrification step. The last step is conducted at 1000 to 300° C. to decompose the nitrogen compounds.

D. Leavitt et al, *Environmental Progress*, 9 (4), 222–228 (1990) and *Environ. Sci. Technol.*, 24 (4), 566–571 (1990), reported that 2,4-dichlorophenoxyacetic acid, atrazine and biphenyl were converted to $CO_2$ and other non-harmful gases ($N_2$ and $N_2O$) through the homogeneous liquid phase oxidation with ammonium nitrate. These reactions were carried out by dissolving the substrates in polyphosphoric acid, adding ammonium nitrate and then heating to about 260° C. for some period of time. Although this process clearly shows that ammonium nitrate is a good oxidizing agent, it is not a process lending itself to treating aqueous waste streams containing from 1,000 to 10,000 ppm TOC.

SUMMARY OF THE INVENTION

This invention relates to an improvement in a thermal or wet oxidation process for the removal of organic carbon and organic or inorganic nitrogen-containing pollutants from wastewater streams using nitrate salts as the denitrifying agent. The improvement resides in the substantial removal of organic or inorganic nitrogen-containing pollutants and partial removal of organic carbon using nitrate salts of aliphatic or aromatic amines or both as the main denitrifying source. The process can also be operated at low temperatures and low pressures to substantially remove nitrogen-containing pollutants. Residual carbon may be removed by low temperature chemical oxidation, activated carbon, or biotreatment. In wastewater streams contaminated with sulfur or phosphorus containing pollutants, the pH of the liquid is maintained in the range of 1.5 to 8 and preferably from 1.5 to 4 by adjustment with alkali metal.

This process can offer several advantages including:

an ability to work with an influent wastewater, e.g., one obtained from a process for the mixed acid dinitration of toluene or mixed acid nitration of aniline, having a low pH (1.5 to 2.5) without causing significant corrosion;

an ability to remove carbon and nitrogen-containing pollutants via a two-step process operation at relatively low temperature and pressure;

an ability to work under strong acidic conditions, e.g., high sulfate, and achieve excellent nitrate removal;

an ability to mitigate the effects of corrosion while operating under low pH conditions; and, an ability to reduce nitrate and ammonia levels under almost redox balanced conditions in a short period of time.

DETAILED DESCRIPTION OF THE INVENTION

Methods for the treatment of wastewater streams containing nitrate, nitrite, sulfate and organic pollutants with ammonia have been previously described. In these processes, ammonium ion (i.e., from ammonium sulfate) acts as the major reducing agent reacting with nitrate (or nitrite) ion to form mainly nitrogen. Organic carbon, typically present in small amounts, would be almost fully oxidized to carbon dioxide during the process.

It has been found that the use of nitrate salts of aliphatic and aromatic amines to remove nitrogen-containing pollutants from waste streams and to reduce total organic content (TOC) offers an improvement to the wet oxidation processes using nitrates as the oxidizing agent. It has been shown in U.S. Ser. No. 09/813,391 that denitrification and TOC removal can be accomplished in a single step operating at high temperature. It has been found in this invention that denitrification and TOC removal can be accomplished through a low pressure, low temperature two-step procedure.

Examples of suitable nitrate salts include the nitrate salts of $C_{1-4}$ alkyl amines, e.g., methylamine, ethylamine, butylamine; and cycloaliphatic amines, such as cyclohexyldiamine, cyclohexylamine, methylcyclohexylamine and methylcyclohexyldiamine. Examples of suitable nitrate salts of aromatic amines include the nitrate salts of aniline and toluenediamine, e.g., meta and ortho isomers.

Thus, nitrate and nitrite, including TOC, can be removed from a waste stream by thermal treatment with salts of aliphatic or aromatic amines such as toluene-monoammonium nitrate and diammonium nitrate salts or the aniline nitrate salts. The use of aromatic or aliphatic amines has the advantage that they can act as better denitrifying agents than ammonia, and particularly so, when used in the presence of sulfate or phosphate. The toluene-diammonium nitrate salts are shown below:

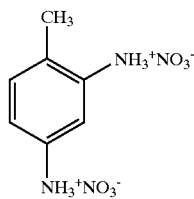 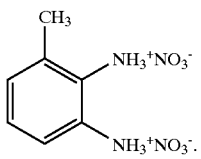

During the process, the nitrate salts of aromatic amines, such as, toluenediamine salts, i.e., the 2,4-and 2,6-isomers as well as the ortho-toluenediamine isomers, i.e., the 3,4-and 4,5-, will decompose to give mainly carbon dioxide and nitrogen gas according to the following chemical equation:

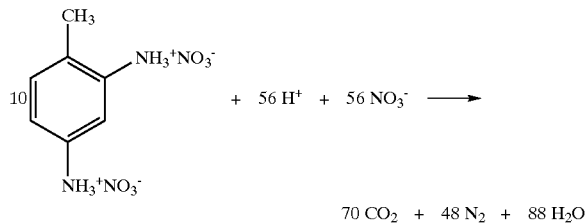

As shown in the above chemical equation, the degradation of nitrate to nitrogen gas by the nitrate salt of toluenediamine (TDA) requires that acid be consumed during the process. Therefore, as the reaction progresses, addition of acid to the reaction media may be necessary to ensure acceptable reaction rates. In a continuous process, a convenient way to provide acidity for this process is by adding minor amounts of ammonium sulfate (2.2 g/l to 4.7 g/l) to produce acidity as shown in the equation below:

$$2.5\ (NH_4)_2SO_4 + 3NaNO_3 \rightarrow 4N_2 + 9H_2O + 0.5Na_2SO_4 + 2HNaSO_4$$

Another alternative is to provide the acidity by feeding the reactor with sulfuric acid as in a semi-batch process. Often sulfur containing compounds are present in the feed. These compounds may supply the necessary acidity.

Because maximum nitrate removal requires working under strong acidic conditions, corrosion of the metal container will occur. However, there are two contributing factors that prevent the corrosion of the stainless steel reactor. One of them consists on balancing or partially balancing anions from strong acids with alkali or alkali earth metal cations. The other comes from the corrosion inhibition effect provided by some organic by-products generated during the oxidative degradation of the organic reducing agents. These features are shown in U.S. Pat. No. 6,332,986 and copending application U.S. Ser. No. 09/659,055 having a filing date of Sep. 11, 2000, the subject mater of each being incorporated by reference.

U.S. Pat. No. 6,332,986 discloses operating said process within a pH range from about 1.5 to 8 and preferably within a pH range of from about 1.5 to 4 by appropriate addition of alkali metal or alkaline earth metal ion (M). Specifically, the ratio of $M/SO4^{-2}$ is maintained from 0.1 to 4, preferably 0.2 to 1, most preferably from 0.4 to 0.7 and the ratio of $M/PO4^{-3}$ of from 0.1 to 2, preferably 0.2 to 0.67 during wet oxidation. Lower ratios, <0.4 for $M/SO4^{-2}$ may be tolerated when the process effluent designed permits operation with some residual carbon compounds in the effluent. High ratios reduce reaction rate.

U.S. Ser. No. 09/659,055 proposed adding organic material to the waste stream to provide acetate ion in a molar ratio from 0.06 to 0.17 moles per mole nitrate or, in the alternative, should the waste stream contain organic material convertible to acetate in the wet oxidation process, maintain a level of organic material sufficient to provide acetate ion in an amount of at least 0.06 moles per mole of nitrate. The addition, or maintenance of organic material convertible to acetate ion acts as a corrosion inhibitor or buffer assisting in reducing corrosion at pH values of 4 and lower.

In this invention, the first step in the wet oxidation process for accomplishing removal of organic carbon and nitrogen-containing pollutants, particularly the nitrate form of nitrogen-containing pollutant, to a desirable level requires balancing the oxidation and reduction properties of all of the oxidizable and reducible species present in the wastewater stream. All nitrogen containing species, organic or inorganic, produce substantially only nitrogen and minor amounts of nitrous oxide gas and all carbon containing species produce substantially only carbon dioxide. Because some of the oxidizable species may decompose to gaseous products (e.g. methane, ethylene, etc.) that do not participate in the nitrate removal process, balancing the waste stream does not necessarily mean effecting a stoichiometric balance of the influent wastewater.

The second step in the process of this invention involves the balancing of organic species such that on substantial reduction of nitrogen in the wet oxidation process there remains sufficient carbonaceous material in solution under the process conditions in the form of a) acetic acid and/or its derivatives such as esters, amides, salts, etc; or b) carbonaceous compounds that upon oxidation are precursors to acetic acid or its derivatives. Typically, the molar ratio of acetate to nitrate is kept from falling below 0.06:1.

If the elimination of organic carbon and nitrogen-containing pollutants is to be effected in a single step, wet oxidation is effected at near critical temperatures, typically from 300 to 373° C. and pressures sufficient to maintain a liquid phase behavior for both the influent and the effluent. If removal of total organic carbon is not required in one step, lower temperatures of from 180 to 300° C., preferably from 230 to 280° C., may be used. Pressures may range in excess of 3000 psig (20,786 kPa) when high temperatures are used and pressures may range from 900 to 1500 psig (6,307 to 10,444 kPa) when low temperatures are used. If gas phase conditions occur, the salts in the wastewater oxidation product may precipitate and cause plugging of the reactor and pressure is adjusted accordingly.

If the elimination of nitrogen-containing pollutants is the objective, the use of aromatic amine nitrate salts as the oxidizing component, in particular, in contrast to ammonium nitrate for example, permits low temperature denitrification and, therefore, low pressures. Temperatures from 180 to about 300° C., preferably from 230 to 280° C. may be used. Pressures may be reduced accordingly to achieve wet oxidation under liquid phase conditions.

Carbon containing pollutants not removed by the lower temperature wet oxidation process, may be removed by conventional methods. These methods include oxidation with hydrogen peroxide or other oxidizing source or by removal with activated carbon. Removal with hydrogen peroxide is commonly effected by the use of Fenton's reagent (hydrogen peroxide and $Fe^{2+}$) at ambient temperature (20–40° C.). Alternatively, wet air oxidation using hydrogen peroxide, compressed air (or oxygen) or ozone can be used to oxidize the remaining organics at temperatures in the range of 20 to 600° C. depending on the oxidizing source employed. Obviously, the advantage of the two-step process is that lower cost, low-pressure equipment may be used to effect removal of contaminating pollutants and there may be a reduced energy cost.

In summary, operation at low pressure for the treatment of wastewater consists of two main steps. In the first step, the wastewater is denitrified at a temperature, e.g., of 280° C., to give an effluent that still contains some TOC. During this step, nitrate (nitrogen) is almost quantitatively removed (at least 90%) and the TOC are greatly reduced (50–80%) depending on its composition. In the second step, residual carbon is removed. Specifically, the effluent can be thermally treated at a low temperature, e.g., 280° C. and low pressures, e.g., 900 to 1500 psig (6307 to 10,444 kPa), in the presence of an oxidant such as air, oxygen or hydrogen peroxide. Alternatively, the denitrified effluent stream can be contacted at ambient temperature and pressure with an adsorbent (i.e. activated carbon) or with bioorganisms to remove or degrade the remaining organic pollutants. The following sets forth a description of the two-step process.

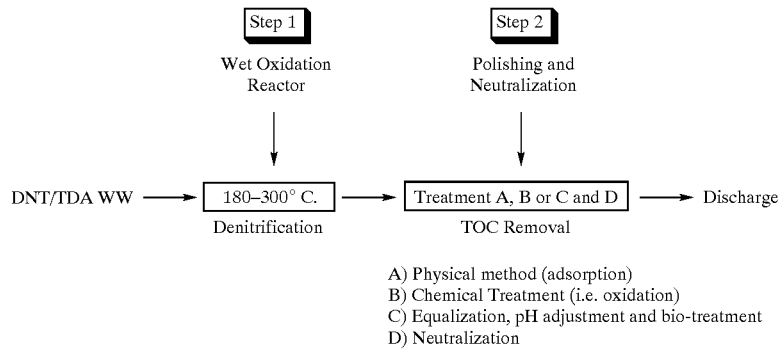

A) Physical method (adsorption)
B) Chemical Treatment (i.e. oxidation)
C) Equalization, pH adjustment and bio-treatment
D) Neutralization Among the physical methods, adsorption on carbon is perhaps the most common method employed by industry. Carbon can be employed either as granular carbon in columns or as powdered carbon added to an activated sludge plant. Carbon can remove most of the organics except low molecular weight soluble compounds such as sugars and alcohols. In general, organic compounds that adsorb best on carbon biodegrade poorly whereas those that adsorb poorly on carbon biodegrade the best. Granular carbon regeneration can be accomplished using acid, caustic, solvent, steam or heat. For a wastewater containing a mixture of different organic components, thermal regeneration is most commonly used. This is typically accomplished using a multiple-hearth furnace or a fluidized-bed furnace. Attrition and oxidation losses range from 5 to 10 wt %. In addition, there is frequently a capacity loss, particularly for low molecular weight organics.

Alternatively, chemical oxidation can be applied to the denitrified wastewater to reduce its TOC. Organic pollutants can be oxidized to $CO_2$ and $H_2O$ or eventually to intermediate product that are non-toxic and biodegradable. The most common oxidants are ozone, hydrogen peroxide catalyzed usually by $Fe^{2+}$ and in some cases chlorine dioxide and UV light. Advanced oxidation systems include hydrogen peroxide/UV light, ozone/UV light and hydrogen peroxide/ozone/UV light. Thermal wet air oxidation at temperatures above 300° C. using compressed oxygen or air can also be used but the disadvantage is that special equipment which can operate at pressures above 2000 psig (13,891 kPa) are required.

Biological treatment can also be used to remove biodegradable organics. Prior to this operation, equalization and pH adjustment is required. The purpose of the equalization step is to reduce variability in flow or strength of industrial wastes so that they can be successfully treated. Biological wastewater treatment typically requires a pH between 6 and 9. Neutralization with lime or magnesium hydroxide is preferred over caustic because of its lower cost. A limestone bed is simply to operate and is applicable to moderately acidic wastewaters. Highly acidic wastewaters are pH adjusted in two steps. The first step adjusts the pH to 3.0–3.5 and the second adjusts the pH to 6.5–7.5. Aerobic treatment is generally applied to lower strength wastewaters, whereas anaerobic treatment is employed as a pretreatment for high strength wastewaters. The choice of process depends both on the concentration of organics and the volume of wastewater to be treated. The objective of biological treatment is to remove biodegradable organics. In an aerobic biological treatment process, organic removal can occur through biodegradation, stripping or sorption on the biological floc. During the biodegradation of organics, approximately one-half of the organic removed are oxidized to $CO_2$ and $H_2O$ and one-half synthesized biomass. Three to ten percent of the organic removed result in soluble microbial products. Degradable VOC will both degrade and strip from the solution. The percentage stripped will depend on the power level in the aeration basin or the type of aeration equipment. Some organics will also be adsorbed on the biological floc.

The following examples are provided to illustrate various embodiments and provide rules for guidance to balance the reduction and oxidation half reactions and are not intended to restrict the scope thereof.

EXAMPLE 1

Effect of Aromatic Amine Nitrate in TDA Waste Stream High Temperature Removal A dinitrotoluene (DNT) wastewater formed by the mixed acid nitration of toluene (sample W5) was prepared by mixing the following wastewater streams: 1340 g of W1, 410 g of W2, 1540 g of W3, and 715 g of W4.

| | | | | DNT Wastewaters (ppm) | | | | | | |
|---|---|---|---|---|---|---|---|---|---|---|
| Waste | Nitrite | Nitrate | Sulfate | Oxalate | $NH_3$ | PH | Na | 2,4-DNBA | TNOC | DNT's |
| W1 | 1,219 | 9,363 | 417 | ND | 0 | ND | 0 | ND | — | ND |
| W2 | 199 | 431 | 6,143 | 99 | 3,184 | 9.2 | 0 | 132 | 357 | 4,192 |
| W3 | 0 | 0 | 9,928 | ND | 0 | ND | 0 | ND | — | ND |
| W4 | 0 | 14,790 | 38,305 | ND | 0 | ND | 0 | ND | — | ND |

| | | TDA Wastewater (g) | | |
|---|---|---|---|---|
| Waste | Water | TDA | Toluidine | Aniline |
| W6 | 1000 g | 1.80 g | 1.75 g | 0.26 g |

TDA wastewater (W6) (345 g) was mixed with DNT wastewater W5 (1155 g) to give an acidic (pH=1.43) orange solution. The solution was adjusted with ammonia (16.93 g, 5.0 N solution), sodium nitrate (1.73 g, 0.02 mole) and sodium hydroxide (27.2 g, 5.0 N solution) to give a solution with a pH=1.65.

The combined DNT/TDA wastewater was analyzed showing the following composition:

| | | Wastewater (ppm) | | | | |
|---|---|---|---|---|---|---|
| Acetate | Nitrate | Ammonia | Sulfate | Sodium | TOC | pH |
| 0 | 5,314 | 1,212 | 8,234 | 2,296 | 782 | 1.65 |

This sample was thermally treated at 370° C. and 3200 (22,165 kPa) for 30 minutes to give a clear effluent with the following composition:

| | | Effluent (ppm) | | | | |
|---|---|---|---|---|---|---|
| Acetate | Nitrate | Ammonia | Sulfate | Sodium | TOC | pH |
| 174 | 0 | 0 | 8,234 | 2,296 | 122 | 2.0 |

The potential for nitrate removal in the combined DNT/TDA wastewater has the following distribution:

| | | |
|---|---|---|
| Potential nitrate removal from ammonia | 2,652 ppm nitrate | 50% |
| Potential nitrate removal from organics | ~3,720 ppm nitrate | 70% |
| Total potential nitrate removal: | 6,372 ppm nitrate | 120% |

The % potential nitrate removals were calculated based on the full conversion of organic-carbon to carbon dioxide and organic/inorganic nitrogen to nitrogen gas.

Other parameters:

| $Na/SO_4^{-2}$ ratio | $NH_4/NO_3$ ratio | Residence time (min) | Temperature (° C.) |
|---|---|---|---|
| 0.55 | 0.83 | 30 | 370 |

| | Effluent Heavy Metals (ppm): | | |
|---|---|---|---|
| Iron | Chromium | Nickel | Molybdenum |
| 4.13 | 0.14 | 1.14 | 0.47 |

This example shows that essentially complete nitrate removal can be accomplished in a relatively short time (continuous process, residence time=30 minutes) when using aromatic amines from toluenediamine (TDA) waste water formed by the slurry phase catalytic hydrogenation of dinitrotoluene as the main reducing agent. Remarkably, ammonia was also completely removed from the wastewater with a significant total organic carbon (TOC) reduction.

EXAMPLE 2

Effect of Residence Time on Nitrate Reduction High Temperature Removal

This example is essentially the same as Example 1, but the thermal treatment was carried out for a shorter period of time. Surprisingly, all nitrate and ammonia were removed from the wastewater in only 20 minutes with the total organic content (TOC) being significantly reduced.

The composition of the wastewater is shown below:

| | | Wastewater (ppm) | | | | |
|---|---|---|---|---|---|---|
| Acetate | Nitrate | Ammonia | Sulfate | Sodium | TOC | pH |
| 0 | 5,359 | 1,211 | 8,127 | 2,485 | 796 | 1.75 |

This sample was thermally treated at 370° C. and 3200 psig (22,165 kPa) for 20 minutes to give a clear and colorless effluent with the following composition:

| Effluent (ppm) | | | | | | |
|---|---|---|---|---|---|---|
| Acetate | Nitrate | Ammonia | Sulfate | Sodium | TOC | pH |
| 217 | 0 | 0 | 8,234 | 2,573 | 118 | 2.0 |

The potential for nitrate removal in the combined DNT/TDA wastewater has the following distribution:

| | | |
|---|---|---|
| Potential nitrate removal from ammonia | 2,652 ppm nitrate | 50% |
| Potential nitrate removal from organics | ~3,720 ppm nitrate | 70% |
| Total potential nitrate removal: | 6,372 ppm nitrate | 120% |

The % potential nitrate removals were calculated based on the full conversion of organic-carbon to carbon dioxide and organic/inorganic nitrogen to nitrogen gas. Other parameters:

| Na/SO$_4^{-2}$ ratio | NH$_4$/NO$_3$ ratio | Residence time (min) | Temperature (° C.) |
|---|---|---|---|
| 0.63 | 0.82 | 20 | 370 |

| Effluent Heavy Metals (ppm): | | | |
|---|---|---|---|
| Iron | Chromium | Nickel | Molybdenum |
| 4.13 | 0.14 | 1.14 | 0.47 |

EXAMPLE 3

Effect of Thermal Treatment on Effluent Gas Composition

Flame incineration of aromatic amines is known to produce nitrogen oxides that are harmful to the environment. Therefore, the purpose of this process was to examine the composition of the gas evolving during the thermal treatment. No NO$_x$ was found.

The gas evolving during the process was collected in a 500 ml stainless steel cylinder and pressurized with helium. The sample was analyzed by Gas Chromatography and compared with calibration standards showing the following composition:

| Component | Mole % |
|---|---|
| Carbon Dioxide | 12.14% |
| Nitrous Oxide | 0.54% |
| Oxygen/Argon | N.D. |
| Nitrogen | 19.40% |
| Methane | 0.05% |
| Carbon Monoxide | N.D. |
| Ethane | <1 ppm |
| Ethylene | 95 ppm |
| Propane | N.D. |
| Propylene | 19 ppm |
| Isobutane | <1 ppm |
| n-Butane | 1 ppm |
| t-2-Butene | 4 ppm |
| 1-Butene | 7 ppm |
| Isobutylene | 13 ppm |
| c-2-Butene | 3 ppm |
| Isopentane | 7 ppm |

Note:
N.D. = Not Detected. The lower limit of detection for O$_2$/Ar and CO is approximately 60 mole ppm.
Note:
The samples were analyzed for C1–C6 hydrocarbons. The data above is the average of two determinations. The lower limit of detection for each hydrocarbon is approximately 1 mole ppm.

EXAMPLE 4

Comparison of Organic Reducing Agents to Nitrate Salts of Aromatic Amines High Temperature Removal In this example organic reducing agents other than amines (i.e., dinitrobenzoic acid (DNBA), dinitrocresols (DNOC), or acetic acid), were used as the reducing agent.

The following samples of synthetic wastewater were prepared according to the following procedures:

Feed for Run 1: ammonium nitrate (40.0 g, 0.5 mole) was dissolved together with ammonium sulfate (7.25 g, 54.9 mmole) and sodium acetate trihydrate (8.04 g, 61 mmole) in 3000 ml of water. To this solution, ammonium hydroxide (5 N solution in water) (26.5 ml, 0.132 mole), sodium hydroxide (5.0 N) (20 ml, 0.1 mole), sulfuric acid (12 N solution) (32.2 ml, 0.1932 mole), dinitrobenzoic acid (7.25 g, 34.2 mmole) and dinitrocresol (0.37 g, 1.86 mmole) were added to give a deep yellow solution with a pH of 1.8.

Feed for Run 2: ammonium nitrate (40.09 g, 0.5 mole) was dissolved together with ammonium sulfate (7.3 g, 55.3 mmole) and sodium acetate trihydrate (5.07 g, 38.4 mmole) in 2952 ml of water. To this solution, ammonium hydroxide (5 N solution in water) (28.2 ml, 0.141 mole), sodium hydroxide (5.0 N) (20 ml, 0.1 mole), sulfuric acid (44%) (41.4 g, 0.18 mole), sodium sulfate (7.71 g, 58.4 mmole), dinitrobenzoic acid (7.20 g, 33.9 mmole) and dinitrocresol (0.34 g, 1.7 mmole) were added to give a deep yellow solution with a pH of 1.9.

Feed for Run 3: same synthetic water as run 1 but thermally treated at 370° C. and 3200 psig (22,165 kPa) for 30 minutes (residence time=30 minutes).

Feed for Run 4: ammonium nitrate (40.68 g, 0.5 mole) was dissolved together with ammonium sulfate (7.78 g, 59.0 mmole) and sodium acetate trihydrate (4.06 g, 30 mmole) in 2970 ml of water. To this solution, ammonium hydroxide (5 N solution in water) (24.6 ml, 0.123 mole), sodium hydroxide (5.0 N) (20 ml, 0.1 mole), sulfuric acid (44%) (23.6 g, 0.1 mole), dinitrobenzoic acid (7.10 g, 33.5 mmole) and dinitrocresol (0.38 g, 1.9 mmole) were added to give a deep yellow solution with a pH of 1.9.

Feed for Run 5: same synthetic water as run 4 but thermally treated for 30 minutes at 370° C. and 3200 psig (22,165 kPa) (residence time=30 minutes).

The synthetic wastewaters were analyzed for organic and inorganic components.

| | | | Wastewaters (ppm) | | | | | | |
|---|---|---|---|---|---|---|---|---|---|
| Feed | Nitrate | Ammonia | Sulfate | Na | DNBA | DNOC | Acetate | TOC | COD |
| 1 | 9,676 | 3,900 | 7,810 | 1,124 | 1,844 | 102 | 1,403 | 1,694 | 3,800 |
| 2 | 9635 | 4,665 | 8,527 | 1,839 | 1,855 | 103 | 939 | 1,520 | 3,425 |
| 3 | 9676 | 3,900 | 7,810 | 1,124 | 1,844 | 102 | 1,403 | 1,694 | 3,800 |
| 4 | 10,160 | 4,489 | 6,330 | 884 | 1,920 | 104 | 636 | 1433 | 3,075 |
| 5 | 10,160 | 4,489 | 6,330 | 884 | 1,920 | 104 | 636 | 1433 | 3,075 |

An excess reducing agent is present in all the synthetic feeds with the purpose of maximizing nitrate removal. The potential nitrate removal from ammonia and organic waste can be seen in the following table:

| Feed # | % Pot. $NO_3$ removal organic | % Pot. $NO_3$ removal $NH_3$ | % Total |
|---|---|---|---|
| 1 | 47.6 | 88.4 | 136 |
| 2 | 40.4 | 106.0 | 146 |
| 3 | 48.0 | 88.0 | 136 |
| 4 | 96.7 | 31.5 | 128 |
| 5 | 96.7 | 31.5 | 128 |

Samples were thermally treated at 370° C. and 3200 psig (22,165 kPa) using the wet oxidation process to give effluents with the following compositions:

| | | | Effluents (ppm) | | | | | | |
|---|---|---|---|---|---|---|---|---|---|
| Feed # | Nitrate | Ammonia | Sulfate | Sodium | DNBA | DNOC | Acetate | TOC | COD |
| 1 | 294 | 1,490 | 7,810 | 1,124 | 0 | 0 | 288 | 188 | 464 |
| 2 | 985 | 2,057 | 8,257 | 1,839 | 0 | 0 | 146 | 112 | 284 |
| 3 | 110 | 1,743 | 7,810 | 1,124 | 0 | 0 | 257 | 150 | 330 |
| 4 | 630 | 1,266 | 6,330 | 884 | 0 | 0 | 42 | 57 | 169 |
| 5 | 215 | 1,611 | 6,330 | 884 | 0 | 0 | 0 | 27 | 62 |

Some of the reaction parameters for every individual run can be seen in the following table:

| Feed # | $Na/SO_4$ | $NH_4/NO_3$ | RT (min) | Temp. (° C.) | Influent pH | Effluent pH |
|---|---|---|---|---|---|---|
| 1 | 0.30 | 1.46 | 20 | 370 | 1.8 | 2.2 |
| 2 | 0.45 | 1.76 | 20 | 370 | 1.9 | 2.1 |
| 3 | 0.30 | 1.46 | 30 | 370 | 1.8 | 2.2 |
| 4 | 0.29 | 1.6 | 20 | 370 | 1.9 | 2.3 |
| 5 | 0.29 | 1.6 | 30 | 370 | 1.9 | 2.3 |

The effluents were also analyzed for iron, chromium, nickel and molybdenum to or the extent of corrosion in every individual run:

| | Effluents Heavy Metals (ppm) | | | |
|---|---|---|---|---|
| Feed # | Fe | Cr | Ni | Mo |
| 1 | 1.06 | <0.07 | 0.89 | <0.30 |
| 2 | 0.31 | <0.07 | 1.0 | <0.17 |
| 3 | 3.68 | <0.05 | 1.0 | <0.17 |
| 4 | <0.12 | 0.1 | 0.90 | <0.17 |
| 5 | <0.12 | 0.23 | 0.85 | <0.17 |

A large excess of reducing agent is necessary to remove most of the nitrate (i.e., feed 3). In consequence, the effluent contains a high concentration of ammonia and/or TOC. Thus, discharge of these effluents to the environment requires further treatment to lower the levels of ammonia or TOC requiring an extra step.

Notice that a "nitrogen containing organic" is not sufficient to define a good reducing agent for the process. The organics used in these examples are "nitrogen containing" but they are ineffective as shown in runs using feeds 4 and 5.

Feeds 1, 2 and 3 show that although the nitrate levels were significantly reduced, no complete nitrate removal was accomplished even though large excess of ammonia potential nitrate removal from ammonia ≧88%) was used. Thus ammonia itself is an ineffective reducing agent at these relatively high sulfate concentrations (~6,000–8,000 ppm). Moreover, excess ammonia remains in the effluent requiring further treatment. Finally, addition of acetic acid was necessary to prevent excessive corrosion of the stainless steel reactor.

EXAMPLE 5

Effect of Ammonia & Nitric Acid on TDA Wastewater High Temperature Removal

In these examples the mixtures of TDA wastewater/ammonia/nitric acid were modified to provide optimum condition for nitrate removal in a continuous process.

A sample of synthetic wastewater (W1) was prepared by dissolving 2,4-toluenediamine (2.15 g, 17.6 mmole), 2,4-dinitrotoluene (0.34 g, 1.87 mmole), aniline (0.31 g, 3.33 mmole) and p-toluidine (2.14 g, 20 mmole) in 3000 ml of water.

Another solution of synthetic (W2) wastewater was prepared by dissolving sodium nitrate (45.3 g, 0.53 mole), 2,4-DNBA (6.511 g, 30.7 mmole), $H_2SO_4$ (69.5 g, 12 N, 0.31 mole), ammonium hydroxide (35.2 ml, 5 N, 0.18 mole) and $NaAcO.3H_2O$ (1.35 g, 9.92 mmole) in 3000 ml of water.

Feed for Run 1: a 750 ml sample of W1 was mixed with an equal volume of W2 to give an acidic (pH=1.6) and deeply colored solution (purple). The combined waste water was pH adjusted with 13.5 g of sodium hydroxide 5.0 N to give a solution with a pH=1.9.

Feed for Run 2: a 750 ml sample of W1 was mixed with an equal volume of W2 to give an acidic (pH=1.6) and deeply colored solution (purple). Ammonium hydroxide (4.33 g, 5.0 N solution) and sodium hydroxide (4.0 g, 5.0 N solution) were added to the combined waste to give a solution with a pH=1.9.

Feed for Run 3: a 750 ml sample of W1 was mixed with an equal volume of W2 to give an acidic (pH=1.6) and deeply colored solution (purple). Ammonium hydroxide (8.5 g, 5.0 N solution was added to the combined waste to give a solution with a pH=1.9.

Analysis of this wastewater gave the following concentrations:

| | | | Wastewater (ppm) | | | | | |
|---|---|---|---|---|---|---|---|---|
| Run # | Acetate | Nitrate | Ammonia | Sulfate | Sodium | TOC | COD | PH |
| 1 | 139 | 4,983 | 502 | 4,663 | 2,700 | 932 | 2,914 | 1.9 |
| 2 | 139 | 5,163 | 681 | 4,798 | 2,840 | 932 | 2,930 | 1.9 |
| 3 | 158 | 5,136 | 930 | 4,873 | 2,043 | 978 | 2,858 | 1.9 |

The samples were thermally treated for 30 minutes at 370° C. and 3200 psig (22,165 kPa) to give a clear effluent with the following composition:

| | | | Effluent (ppm) | | | | | |
|---|---|---|---|---|---|---|---|---|
| Run # | Acetate | Nitrate | Ammonia | Sulfate | Sodium | TOC | COD | PH |
| 1 | 308 | 1,132 | 152 | 4,813 | 2,496 | 350 | 976 | 7.0 |
| 2 | 292 | 357 | 72 | 4,798 | 2840 | 238 | 654 | 6.3 |
| 3 | 235 | 280 | 120 | 4,873 | 2,043 | 306 | 740 | 2.3 |

The potential for nitrate removal for these feeds were as follows:

| Run # | % Pot. $NO_3$ removal Organic | % Pot. $NO_3$ removal $NH_3$ | % Total |
|---|---|---|---|
| 1 | 97 | 22 | 119 |
| 2 | 97 | 29 | 126 |
| 3 | 97 | 39 | 136 |

Other parameters:

| Run # | $Na/SO_4^{-2}$ ratio | $NH_4/NO_3$ ratio | Residence time (min) | Temperature (° C.) |
|---|---|---|---|---|
| 1 | 1.2 | 0.36 | 30 | 370 |
| 2 | 1.23 | 0.48 | 30 | 370 |
| 3 | 0.87 | 0.66 | 30 | 370 |

| -continued | | | |
|---|---|---|---|
| | Effluent Heavy Metals (ppm) | | |
| Run # | Iron | Chromium | Nickel | Molybdenum |
| 1 | <0.17 | <0.05 | <0.15 | <0.67 |
| 2 | <0.17 | <0.05 | <0.15 | <0.67 |
| 3 | <0.17 | <0.05 | <0.15 | <0.67 |

From the above, increasing the concentration of ammonia as shown from runs 1 to 3 causes an increase in the nitrate removal. Noteworthy, a change in the concentration of ammonia from 502 ppm (run 1) to 681 ppm (run 2) caused a jump in the % nitrate removal from 77% to 93%. The data also shows that too much ammonia can be detrimental to the TOC content in the effluent as shown in run 3.

EXAMPLE 6

Effect on Sulfate Ion Using Ammonium Nitrate or Toluenediammonium Nitrate High Temperature Removal Denitrifying Agent OTD.

Run 1: A synthetic wastewater (WW) feed was prepared by dissolving OTD (ortho-toluenediamine) (1.025 g, 8.4 mmole), ammonium nitrate (2.14 g, 26.75 mmole), sodium nitrate (4.56 g, 53.6 mmole), ammonium hydroxide (3.39 g of 5 N solution), sodium hydroxide (16 g, 5 N solution) and sulfuric acid (12.75 g, 12 N solution, 57.2 mmole) in 1000 ml of water.

Run 2: The feed was prepared by addition of sodium sulfate (1.0 g, 7.04 mmole) to the synthetic feed of run 1.

Run 3: The feed was prepared by addition of sodium sulfate (2.0 g, 14.08 mmole) to the synthetic feed of run 1.

Run 4: A synthetic feed was prepared by dissolving ammonium nitrate (6.45 g, 80.62 mmole), sodium acetate (1.38 g, 10.14 mmole), ammonium hydroxide (8.5 g of 5 N solution), sodium hydroxide (16.6 g, 5 N solution) and sulfuric acid (12.75 g, 12 N solution, 57.2 mmole) in 1000 ml of water.

Run 5: The feed was prepared by addition of sodium sulfate (1.0 g, 7.04 mmole) to the synthetic feed of run 4.

Run 6: The feed was prepared by addition of sodium sulfate (2.0 g, 14.08 mmole) to the synthetic feed of run 4.

Analyis.

| Denitrifying agent OTD. | | | |
|---|---|---|---|
| Run # | % Pot. $NO_3$ removal OTD | % Pot. $NO_3$ removal $NH_3$ | % Total |
| 1 | 75 | 25 | 100 |
| 2 | 75 | 25 | 100 |
| 3 | 75 | 25 | 100 |

| Analysis of the synthetic feeds: | | | |
|---|---|---|---|
| Run # | Nitrate (ppm) | Ammonia (ppm) | Sulfate (ppm) |
| 1 | 4,834 | 656 | 5,284 |
| 2 | 4,834 | 656 | 6,415 |
| 3 | 4,834 | 656 | 6,800 |

The synthetic feeds were thermally treated for 20 minutes at 370° C. and 3200 psig (22,165 kPa) and the effluents were analyzed.

Analysis of the effluents:

| Run # | Nitrate (ppm) | Ammonia (ppm) | Sulfate (ppm) |
|---|---|---|---|
| 1 | 265 | 0 | 5,284 |
| 2 | 522 | 0 | 6,415 |
| 3 | 641 | 18 | 6,800 |

Thus, the % nitrate removal (NR) changed according to the sulfate concentration as shown below:

| Run # | Sulfate (ppm) | % Nitrate Removal | % Change in NR |
|---|---|---|---|
| 1 | 5,284 | 94.3 | 0.0 |
| 2 | 6,415 | 90.0 | 4.3 |
| 3 | 6,800 | 86.6 | 7.7 |

Therefore, increasing the sulfate concentration from 5284 ppm to 6800 ppm caused a 7.7% change in the nitrate removal.

Analyis.

Denitrifying agent NH$_3$.

| Run # | % Pot. NO$_3$ removal Acetate | % Pot. NO$_3$ removal NH$_3$ | % Total |
|---|---|---|---|
| 4 | 60 | 90 | 150 |
| 5 | 60 | 90 | 150 |
| 6 | 60 | 90 | 150 |

Analysis of the synthetic feeds:

| Run # | Nitrate (ppm) | Ammonia (ppm) | Sulfate (ppm) |
|---|---|---|---|
| 4 | 4,692 | 2,236 | 5,264 |
| 5 | 4,692 | 2,236 | 6,061 |
| 6 | 4,692 | 2,236 | 6,612 |

The synthetic feeds were thermally treated for 20 minutes and the effluents were analyzed.

Analysis of the effluents:

| Run # | Nitrate (ppm) | Ammonia (ppm) | Sulfate (ppm) |
|---|---|---|---|
| 4 | 1,180 | 1,047 | 5,264 |
| 5 | 1,691 | 1,047 | 6,061 |
| 6 | 2,492 | 1,047 | 6,612 |

Thus, the % nitrate removal (NR) changed according to the sulfate concentration as shown below:

| Run # | Sulfate (ppm) | % Nitrate Removal | % Change in NR |
|---|---|---|---|
| 4 | 5,264 | 74.5 | 0.0 |
| 5 | 6,061 | 63.5 | 11 |
| 6 | 6,612 | 46.8 | 28 |

The data can be summarized in the diagram below:

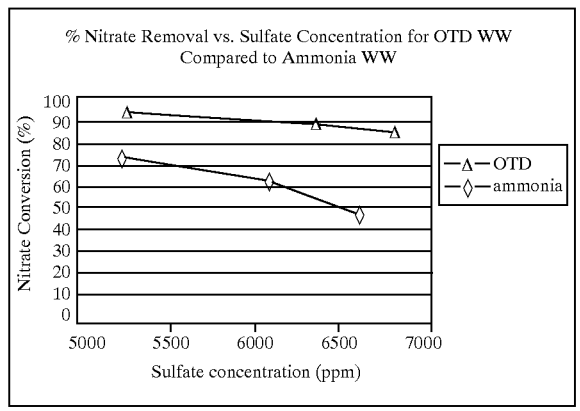

Examination of the data shows the inhibition on denitrification caused by the presence of sulfate ion. From the above data, and as reflected in the graph, increasing the sulfate concentration from 5,264 ppm to 6,612 ppm caused a 28% decreased in the nitrate removal when ammonia is used as denitrifying agent. A comparison between runs 1 and 4 shows that OTD is a better agent for nitrate removal than ammonia because under similar conditions OTD removed 94.3% of the nitrate while ammonia only 74.5%. In addition, a comparable increase in the sulfate concentration (going up 1348 ppm for the ammonia case and 1516 ppm for the OTD case) caused a 28% decrease in the nitrate removal for ammonia as compared to OTD where only 7.7% was observed.

EXAMPLE 7

Effect of Aniline as Denitrifying Agent High Temperature Removal

A synthetic sample of aniline wastewater was prepared by dissolving aniline (1.33 g, 14.3 mmole), sulfuric acid (8.0 g, 12 N solution), ammonia (5.90 g, 5.02 N solution), acetic acid (0.7 g, 11.6 mmole) and sodium nitrate (7.65 g, 90 mmole) in 1000 ml of water. The solution was analyzed as shown below:

| Nitrate | Ammonia | Acetate | Sulfate | Sodium | pH |
|---|---|---|---|---|---|
| 5600 | 464 | 676 | 3800 | 2230 | 2.0 |

Concentrations are in ppm units.

The wastewater sample was then treated for 20 minutes at 370° C. to give a pale yellow effluent with the following composition:

| Nitrate | Ammonia | Acetate | Sulfate | Sodium | pH |
|---|---|---|---|---|---|
| 300 | 110 | 610 | 3800 | 2230 | 6.8 |

Concentrations are in ppm units.

Therefore, good nitrate removal (95%) can be accomplished using aniline as main denitrifying agent.

This example shows that no appreciable corrosion occurred in the presence of added acetate ion corrosion inhibitor as evidenced by the low concentration of transition metals present in the effluent. It also shows that good nitrate removal can be accomplished when aniline (or anilinium salts) are used as the main denitrifying agent.

EXAMPLE 8

Effect of Aniline in the Absence of Acetic Acid High Temperature Removal

In this example, aniline was used as the main denitrifying agent in the absence of added acetic acid (the corrosion inhibitor).

A synthetic sample of aniline wastewater was prepared by dissolving aniline (1.33 g, 14.3 mmole), sulfuric acid (7.60 g, 12 N solution), ammonia (5.91 g, 5.02 N solution) and sodium nitrate (7.65 g, 90 mmole) in 1000 ml of water. The solution was analyzed as shown below:

| Nitrate | Ammonia | Acetate | Sulfate | Sodium | pH |
|---|---|---|---|---|---|
| 5471 | 413 | 0 | 3321 | 2000 | 2.0 |

Concentrations are in ppm units.

The wastewater sample was then treated for 20 minutes at 370° C. to give a pale clear yellow effluent with the following composition:

| Nitrate | Ammonia | Acetate | Sulfate | Sodium | pH |
|---|---|---|---|---|---|
| 600 | 140 | ~150 | 3321 | 2000 | 7.1 |

Concentrations are in ppm units.

Therefore, a good nitrate removal (90%) can be accomplished using aniline as main denitrifying agent.

The effluent was analyzed for iron, chromium, nickel and molybdenum. The results showed that no appreciable corrosion occurred even though no acetate was added to the wastewater. The data is shown below:

| Fe | Cr | Ni | Mo |
|---|---|---|---|
| <0.3 | <0.1 | <0.2 | 3.05 |

Concentrations are in ppm units.

The results showed that excellent % nitrate removal was obtained as in Example 7. The experiment shows that even in the absence of added acetate, aniline can act as a very good denitrifying agent without causing corrosion. Notice that the influent wastewater contained no acetate. However, small amounts of acetate ion were detected after thermal treatment (~150 ppm). This indicates that acetate was formed during the thermal oxidation of aniline, the only organic component present in the mixture. The slow corrosion rate was evidenced by the very low concentrations of iron, chromium, nickel and molybdenum present in the effluent.

Example 9

Low Temperature Denitrification Step Nitrate Removal at 280° C.

The wastewater prepared in Example 1 was thermally treated for 20 minutes (residence time=20 minutes) in a continuous reactor heated at 280° C. The pressure inside the reactor was maintained at 1400 psig (9,754 kPa) to keep a liquid phase and prevent the precipitation of inorganic salts. The solution was passed through the tubular reactor of ⅛" internal diameter and 250 ml volume at a rate of approximately 12.5 ml/min.

The composition of the wastewater before and after treatment can be seen in the following comparative table (concentrations in ppm):

| pH | Nitrate | Ammonia | Sulfate | TOC | COD | Sodium |
|---|---|---|---|---|---|---|
| 1.65 | 5,631 | 1,178 | 8,438 | 987 | 2,715 | 2,136 |
| Wastewater was thermally treated at 280° C. and 1400 psig (9754 kPa) pressure ||||||||
| 1.93 | 150 | 300 | 8,438 | 360 | 880 | 2,136 |

| % Reductions ||||
|---|---|---|---|
| % Nitrate Reduction | % Ammonia Reduction | % TOC Reduction | % COD Reduction |
| 97.3 | 75 | 63.5 | 67.6 |

Examination of the effluent also shows that corrosion of the reactor was minimal due to the presence of a significant amount of sodium ions added to the stream prior treatment.

| Iron | Chromium | Nickel | Molybdenum |
|---|---|---|---|
| 28 | 0.11 | 6.0 | 3.0 |

Concentrations in ppm

This example illustrates that excellent yields of nitrate removal (>90%) can be accomplished at temperatures and pressures much lower than those used in "critical or near critical" processes. In addition, the results suggests that TOC can also be significantly reduced (>50%) despite the fact that at these temperatures the rate of decomposition of some of the organics is expected to be much slower than the rates typically observed under "near critical conditions". However, polishing of the effluent may be required in order to meet some environmental regulations.

EXAMPLE 10

Effect of Temperature on Nitrate Removal

Wastewaters prepared according to the procedure described in Example 1 were thermally treated for 20 minutes (residence time=20 minutes) at different temperature in the range of 180 to 370° C. The pressure inside the reactor was maintained in the range of 470 to 3200 psig (3,342 to 22,165 kPa) to keep a liquid phase and prevent the precipitation of inorganic salts. The composition of the wastewater before and after treatment can be seen in the following comparative table:

| Run # | Press. psig | Temp. °C | Nitrate influent | Nitrate effluent | % Nitrate Reduction | NH$_3$ influent | NH$_3$ effluent | % NH$_3$ Reduction |
|---|---|---|---|---|---|---|---|---|
| 1 | 3,200 | 370 | 5,528 | ND | 100 | 1772 | ND | 100 |
| 2 | 1,500 | 280 | 5,292 | ND | 100 | 984 | 79 | 92 |
| 3 | 1,476 | 230 | 5,166 | 332 | 93.6 | 1,064 | 97 | 91 |
| 4 | 470 | 180 | 5,630 | 5,200 | 7.6 | 1,070 | 1,028 | 4.0 |

Concentrations in ppm

This example shows the effect of temperature on the percentage removal of the different components present in the wastewater. It clearly indicates that complete nitrate removal can be effected in short residence times (~20 minutes) at temperatures in the vicinity of 230 to 280° C. and that at lower temperatures (180° C.) longer reaction times will be needed. In addition, the 230–280° C. range offers the advantage of working at pressure of about 900–1,500 (6,307–10,444 kPa) tolerated by conventional industrial reactors. Although operating at 370° C. (near critical conditions) can provide the benefit of operating a single step process with excellent nitrate and TOC removal, as shown in prior examples, such operation requires special equipment that can handle pressures as high as 3,200 psig (22,165 kPa).

The effect of temperature on the TOC and COD removal can be seen in the table below. A decrease in the efficiency of TOC and COD removal is observed with a decrease in temperature. Thus, nitrate can be removed completely at temperatures in the range of 230 to 280° C. but TOC needs to be further reduced in a subsequent step.

| Run # | Press. psig | Temp. °C | TOC influent | TOC effluent | % TOC Reduction | COD influent | COD effluent | % COD Reduction |
|---|---|---|---|---|---|---|---|---|
| 1 | 3,200 | 370 | 936 | 26 | 97.2 | 1,940 | 72 | 96.3 |
| 2 | 1,500 | 280 | 1,909 | 365 | 81.0 | 2,870 | 943 | 67 |
| 3 | 1,476 | 230 | 1,075 | 535 | 50.0 | 3,020 | 1,430 | 53 |
| 4 | 470 | 180 | 1,007 | 822 | 18.4 | 2,890 | 2,480 | 14.2 |

Concentrations in ppm

EXAMPLE 11

Polishing Step TOC Reduction Using Hydrogen Peroxide and Thermal Treatment

A sample of denitrified wastewater containing a variety of organic contaminants was prepared and thermally treated at 280° C. in the presence of hydrogen peroxide (50 wt. % H$_2$O$_2$, 30 g/l of wastewater). The approximate composition of the wastewater before and after treatment can be seen in the following comparative table (concentrations in ppm):

| Wastewater | | |
|---|---|---|
| pH | TOC | COD |
| 1.62 | 1,100 | 9,400 |
| Wastewater thermally treated at 280° C. and 1480 psig (10,306 kPa) pressure | | |
| 1.7 | 110 | 110 |
| % Reductions | | |
| % TOC Reduction | | % COD Reduction |
| 90 | | 98 |

These data show that excellent COD and TOC removal can be accomplished using a two step process which comprises initially removing nitrogen contaminating 15 pollutants at low temperature using aromatic amine nitrates as the oxidizing source followed by hydrogen peroxide treatment at 280° C. and 1500 psig (10,444 kPa). This two step procedure avoids the high temperatures and pressures in processes that operate at critical or near-critical conditions.

EXAMPLE 12

Polishing Step TOC Reduction Using Adsorption on Carbon

A sample of wastewater containing a variety of organic contaminants was prepared and denitrified at 280° C. The approximate composition of the wastewater before and after treatment can be seen in the following comparative table (concentrations in ppm):

| Press. psig | Temp. °C. | Nitrate influent | Nitrate effluent | % Nitrate Reduction | $NH_3$ influent | $NH_3$ effluent | % $NH_3$ Reduction | TOC influent | TOC effluent | % TOC Reduction | COD influent | COD effluent | % COD Reduction |
|---|---|---|---|---|---|---|---|---|---|---|---|---|---|
| 1,500 | 280 | 5,229 | ND | 100 | 1,415 | 40 | 97 | 1,024 | 306 | 70 | 2,580 | 750 | 70 |

The denitrified liquid was passed through a carbon filter at atmospheric temperature and pressure to give a clear and colorless effluent. The samples were analyzed for TOC and COD:

| TOC influent | TOC effluent | % TOC Reduction | COD influent | COD effluent | % COD Reduction |
|---|---|---|---|---|---|
| 306 | 18 | 94 | 750 | 70 | 90 |

What is claimed is:

1. In a process for the wet oxidation of a waste stream containing organic carbon and organic or inorganic nitrogen-containing pollutants using a nitrate as the denitrifying agent under conditions wherein at least a portion of the organic carbon is converted to carbon dioxide and at least a portion of organic or inorganic nitrogen-containing pollutants are converted to nitrogen, the improvement which comprises:
   initially removing organic or inorganic nitrogen-containing pollutants using a nitrate salt of an aliphatic amine or an aromatic amine as the denitrifying agent at a temperature from 180 to 300° C. and a pressure sufficient to maintain liquid phase conditions; and,
   then, effecting further removal of the organic carbon containing pollutant by treatment with activated carbon, chemical oxidation, or biotreatment.

2. The process of claim 1 wherein the aliphatic amine is a $C_{1-4}$ alkyl amine or a cycloaliphatic amine.

3. The process of claim 2 wherein the aliphatic amine is selected from the group consisting of methylamine, ethylamine, butylamine, cyclohexylamine, methylcyclohexylamine, cyclohexyldiamine, and methylcyclohexyldiamine.

4. The process of claim 2 wherein pH is maintained within a range of 1.5 to 4.

5. The process of claim 4 wherein the nitrate salt is an aromatic amine nitrate.

6. The process of claim 5 wherein the aromatic amine nitrate is selected from the group consisting of toluene-monoammonium nitrate, toluene-diammonium nitrate and aniline ammonium nitrate.

7. The process of claim 6 wherein the aromatic amine nitrate is selected from the group consisting of toluenediamine nitrate salts represented by the formulas:

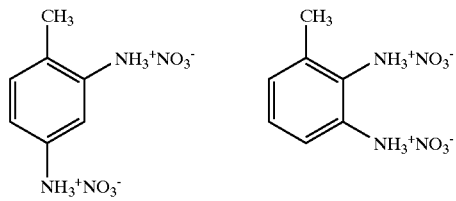

and a nitrate salt of aniline.

8. The process of claim 7 wherein the process is carried out a temperature of from 230 to 280° C.

9. The process of claim 8 wherein the process is operated at a pressure of from 900 to 1500 psig (6,307 to 10444 kPa).

10. The process of claim 9 wherein the waste stream is contaminated with a nitrate form of organic or inorganic nitrogen-containing pollutant.

11. The process of claim 10 wherein from 50 to 80% of total organic carbon is removed in the wet oxidation process.

12. The process of claim 11 wherein the waste stream is contaminated with nitroaromatics.

13. The process of claim 12 wherein the waste stream is contaminated with sulfur containing compounds and pH is controlled by addition of an alkali metal.

14. The process of claim 13 wherein the waste stream is contaminated with sulfur containing components and ammonium acetate or acetic acid is added to the waste stream.

15. The process of claim 14 wherein the waste stream is obtained from mixed acid dinitration of toluene.

\* \* \* \* \*